(12) United States Patent
Weldemariam et al.

(10) Patent No.: US 11,095,734 B2
(45) Date of Patent: Aug. 17, 2021

(54) SOCIAL MEDIA/NETWORK ENABLED DIGITAL LEARNING ENVIRONMENT WITH ATOMIC REFACTORING

(71) Applicant: International Business Machines Corporation, Armonk, NY (US)

(72) Inventors: Komminist Weldemariam, Ottawa (CA); Shikhar Kwatra, Durham, NC (US); James R. Kozloski, New Fairfield, CT (US); Michael S. Gordon, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 16/055,671

(22) Filed: Aug. 6, 2018

(65) Prior Publication Data
US 2020/0045119 A1 Feb. 6, 2020

(51) Int. Cl.
*G06Q 20/22* (2012.01)
*G06Q 50/20* (2012.01)
*H04L 29/08* (2006.01)
*G06Q 50/00* (2012.01)

(52) U.S. Cl.
CPC ............. *H04L 67/22* (2013.01); *G06Q 20/22* (2013.01); *G06Q 50/01* (2013.01); *G06Q 50/20* (2013.01)

(58) Field of Classification Search
CPC ........ H04L 67/22; G06Q 20/22; G06Q 50/20; G06Q 50/01; G09B 5/02

USPC ...... 705/1.1, 50; 434/322, 353, 236; 706/16, 706/46
See application file for complete search history.

(56) References Cited

U.S. PATENT DOCUMENTS

| | | | |
|---|---|---|---|
| 5,772,446 A | 6/1998 | Rosen | |
| 9,882,918 B1 | 1/2018 | Ford et al. | |
| 2005/0095569 A1 | 5/2005 | Franklin | |
| 2010/0120011 A1 | 5/2010 | O'Brien | |
| 2011/0212430 A1* | 9/2011 | Smithmier | G09B 7/00 434/322 |
| 2012/0260232 A1 | 10/2012 | Hirsch et al. | |
| 2012/0282576 A1 | 11/2012 | Chenoweth et al. | |
| 2012/0330869 A1* | 12/2012 | Durham | G06N 5/022 706/16 |
| 2014/0046891 A1* | 2/2014 | Banas | G06N 5/022 706/46 |

(Continued)

*Primary Examiner* — Lynda Jasmin
*Assistant Examiner* — Kimberly L Evans
(74) *Attorney, Agent, or Firm* — Scully, Scott, Murphy & Presser, P.C.; Shimon Benjamin

(57) ABSTRACT

A set of learner data associated with a learner is received. The set of learner data includes at least a real-time data stream, e.g., derived from instrumentation, in a social network enabled digital learning environment. Based on the set of learner data, at least one learning improvement strategy is determined for improving the learner's learning capability. Atomic level mentorship activities are generated. Each atomic level mentorship activity is targeted with a specific skill and knowledge item and having an estimated duration period. At least one mentorship is identified from at least one social network platform. An initial incentive structure comprising at least an amount of payment and payment modality is created. The atomic level mentorship activities with the initial incentive structure are presented.

18 Claims, 8 Drawing Sheets

(56) References Cited

U.S. PATENT DOCUMENTS

| | | | |
|---|---|---|---|
| 2014/0272847 A1* | 9/2014 | Grimes | G09B 7/08 |
| | | | 434/236 |
| 2015/0079565 A1 | 3/2015 | Miller et al. | |
| 2016/0055443 A1 | 2/2016 | Chee et al. | |
| 2017/0039867 A1* | 2/2017 | Fieldman | G11B 27/031 |
| | | | 434/353 |
| 2017/0103167 A1 | 4/2017 | Shah | |
| 2017/0364701 A1 | 12/2017 | Struttmann | |
| 2018/0197173 A1* | 7/2018 | Durvasula | G06Q 20/209 |
| | | | 705/50 |
| 2018/0204111 A1* | 7/2018 | Zadeh | G06K 9/3233 |
| | | | 706/16 |

* cited by examiner

US 11,095,734 B2

SOCIAL MEDIA/NETWORK ENABLED DIGITAL LEARNING ENVIRONMENT WITH ATOMIC REFACTORING

FIELD

The present application relates generally to computers and computer applications, and more particularly to social media and/or network enabled digital learning.

BACKGROUND

The education industry has been undergoing a front-office transformation driven by mobile and increasing availability of digital content. For example, easier access to devices such as tablets, personal computers and mobile devices, choices of affordable learning devices connected to faster networks, and growing popularity of social computing and educational apps and services on mobile devices, are providing broader perspectives to learning methods.

Various approaches and systems have been discussed to help both students and teachers through personalization, adaptation, and tutoring mechanism. For example, digital learning platforms may combine both inside and outside classroom experiences to provide personalized experience and learning pathways based on the learner progress, engagement, knowledge models, preference, learning styles as well as historical sentiment toward a topic, content or subject matter.

BRIEF SUMMARY

A method, in one aspect, includes receiving a set of learner data associated with a learner. In one aspect, the set of learner data includes at least a real-time data stream derived, for example, from an instrumentation, in a social network-enabled digital learning environment. In one aspect, the method also includes, based on the set of learner data, determining at least one learning improvement strategy for improving the learner's learning capability. In one aspect, the method also includes, generating atomic level mentorship activities, each atomic level mentorship activity targeted with a specific skill and knowledge item and having an estimated duration period. In one aspect, the method also includes, identifying mentorship from at least one social network platform. In one aspect, the method also includes, creating an initial incentive structure comprising at least an amount of payment and payment modality. In one aspect, the method also includes, presenting the atomic level mentorship activities with the initial incentive structure.

A system, one aspect, includes at least one hardware processor. In one aspect, at least one memory device is communicatively coupled to the at least one hardware processor. In one aspect, at least one hardware processor operable to receive a set of learner data associated with a learner, the set of learner data comprising at least a real-time data stream, for example, derived from instrumentation, in a social network enabled digital learning environment. In one aspect, at least one hardware processor is further operable to, based on the set of learner data, determine at least one learning improvement strategy for improving the learner's learning capability. In one aspect, at least one hardware processor is further operable to generate atomic level mentorship activities. In one aspect, each atomic level mentorship activity is targeted with a specific skill and knowledge item and having an estimated duration period. In one aspect, at least one hardware processor is further operable to identify mentorship from at least one social network platform. In one aspect, at least one hardware processor is further operable to create an initial incentive structure comprising at least an amount of payment and payment modality. In one aspect, at least one hardware processor is further operable to present the atomic level mentorship activities with the initial incentive structure.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
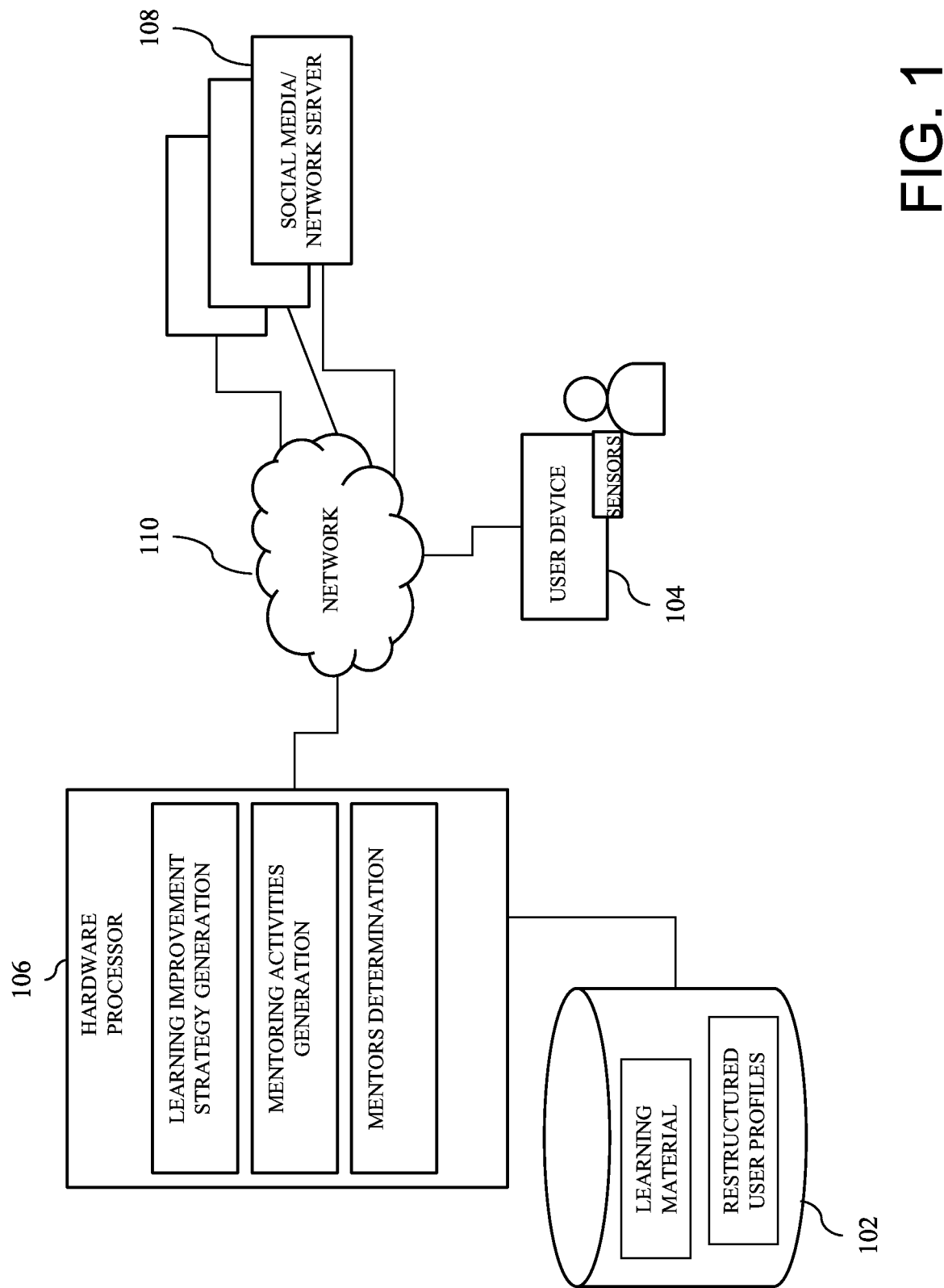
FIG. 1 is a diagram illustrating an example social network enabled digital learning environment in one embodiment.

In embodiments, system, methods and techniques are provided, which in various aspects may identify one or more (e.g., micro-level) mentorship or tutoring activities based on learning improvement plans or predicted a learning curve for a student or learner and post on one or more social media networks or apps. Systems, methods and techniques, in various aspects may also determine one or more technical and social aspects of a social media user that are relevant for educational purposes, e.g., by hierarchically and semantically linking and organizing, e.g., per a grade, topics, curricula, learning standards (e.g., Common Core Standard). Systems, methods and techniques, in various aspects may also update a social media user profile based on the determined one or more technical and social aspects, and may further dynamically structure incentives to potential mentors or tutors based on expected mentorship outcomes.

The use of a manual (e.g., a human tutor or mentor), system-based (e.g., tutor system), and a combination of both have been discussed and have shown improvements in learning outputs of students. For a human tutor or mentor, the assignment of a mentor or tutor to the student is usually determined or decided based on the analysis of learning progression or learning outputs. For system-based approach, the tutoring system may receive one or more factors (e.g., analysis of learning progression, learning outputs, intervention plans) to instantiate a tutoring session for the user. The tutoring system may monitor and analyze the progression so far and progressively update the previous tutoring session with the appropriate tutoring content.

Social media servers or apps may provide good sources to find experienced, knowledgeable, or skilled individuals in both technical and social aspects. Such sources can be leveraged for educational purposes. In an embodiment, a social media or app for an adaptive learning system or a tutoring system allows for posting a request for mentorship or tutoring wherein the request payload may include analysis of learning progression, learning goals, intervention plans, duration required for the tutoring or mentoring, and proposed incentive or reward for the tutor or mentor. In an embodiment, a system may be presented that can find one or more appropriate mentors or tutors and connect the student, and provide incentive(s) to the one or more mentors for the service. In one embodiment, the incentive is financial.

In some aspects, a method and/or system in the present disclosure analyzes student outcomes at the atomic level of specific skills and knowledge items and their application to solving specific problems on a test based on identifying educational mentorships from social media networks. In some aspects, a method and system operate in a social network enabled digital learning (e.g., including tutoring) environment. A method and/or system, in some aspects, determine at least one effective learning improvement strategy in performance, engagement, interaction and/or social activities based on historical student data. A method and/or system, in some aspects, determine atomic level mentorship activities each targeted with specific skills and knowledge items for an estimated duration period T. A method and/or system, in some aspects, may identify appropriate mentorship from social media networks to accelerate or improve learning outcomes. A method and/or system, in some aspects, facilitate the mentorship activities through the social network enabled digital learning environment, and may dynamically generate incentive structure for the mentors based on mentorship outcomes.

In an embodiment, a system and/or method identify educational mentors or tutors for a student using dynamically identified one or more atomic-level mentorship or tutoring activities based on predicted student progress as function of one or more factors such as learner context, learner cohort, content analysis, from one or more social media networks, in the technical subject matter areas and social aspects that the student (or any identified learner) needs to improve, thus learning outcome.

In an embodiment, a system may run, for example, in the background of a digital learning environment during which the learner interacts with learning materials, and determine learning improvement strategy and generate mentoring activities, which is posted on one or more social media networks or apps.

In an embodiment, the disclosed social media enabled digital learning environment may facilitate learning and/or tutoring via learning materials (e.g., content, tests), collect plurality of data points such as learning events and activities and cognitive and affective signals (e.g., using various native and instrumented sensors on a mobile device), infer and/or model student states from multiple heterogeneous inputs on a device such as a tablet, mobile device, or another device, and recommend personalized interventions by employing heuristics and learning algorithms.

The following illustrates an example scenario. User A is learning about triangles in geometry class and how the angles add up to 180 degrees. On this subject via User A's device (e.g. a tablet), for example, User A has viewed 5 lessons, three of which include video contents of 12 minute, 10 minute and 16 minute durations respectively, and two of which include text such as portable document format (pdf) contents of 6 pages and 9 pages long respectively. Consider that mobile sensors (e.g., coupled to User A's tablet) suggest a state of movement from the student (e.g., accelerometer may detect movements, a gyroscope may detect rotation, other sensors may detect finger pressure, heart rate, and/or perspiration, and an external camera may detect that the student is falling asleep). However, at this stage, whether the sensed data (sensor data) relate to positive or negative impact or whether the sensed data relate to the educational content cannot be ascertained.

Assessment data shows that the student has been taking a quiz and has not been doing well. Analysis of application instrumentation data such as repeated rewinds shows the student is getting stuck with the content and is taking too long to answer each question and is therefore at risk of not completing the quiz in the allotted time. Analysis of application instrumentation data also shows the student spent a total time of two hours on this topic, obtained below classroom average score, effectively engaged for only 42 minutes, showed slow progress in reading arithmetic topic showing adding angles discussed on lessons, and observed consistently negative sentiment.

Performing the analysis of application instrumentation, for example, allows a system to infer that the sensor data (sensed data from sensors of User A's device above) may be due to student fidgeting and/or pacing the room due to frustration, irritation and/or misunderstanding of the prerequisite concept and quiz questions. The system may then infer that the student is possibly frustrated and/or irritated.

A method and/or system, for instance, responsive to determining a user's or student's learning state may provide an intervention to improve a learning process for the student. For instance, in an embodiment, a method and/or system to identify a mentorship that shows appreciation for the student for his effort and asks the student if he would like to see new content on this topic, or try a different (e.g., easier) topic. In that way, material can be reviewed until the student understands the topic and can move to new material.

In an embodiment, a system and/or method can maintain a catalogue of "problems" (e.g., test questions which identify areas or topics in which a student needs further understanding or learning) across all subjects, with students assigned to multiple "problem categories" based on their current and predicted learning status and outcomes surrounding these specific problems. An embodiment of an implementation may include detecting current and predicted learning status and outcomes surrounding these specific problem categories includes detecting student's performance pattern and initial motivation level, analyzing learning context (e.g., time of the day, student, content, environmental related context), identifying their mastery on skills being studied or attained by the student via semantic analysis, Natural Language Processing (NLP), and recognizing the level of their engagement deteriorating beyond the configurable threshold level over time. In an embodiment, the detected current and predicted learning status and outcomes is used to generate an initial set of interventions, which are then fed to a computer-implemented module (e.g., referred to as a learning improvement strategy generator) that generates one or more effective and optimal learning improvement strategies along engagement, performance, interaction and/or social activity metrics.

In an embodiment, the system and/or method may dynamically generate atomic level mentoring or tutoring activities (e.g., by implementing a computer-implemented module, referred to as a mentoring activity generator (for explanation sake)) wherein each activity may be targeted to specific skills and knowledge items based on analyzing a catalogue of "problems," plurality of historical student data points, additional real-time data stream derived from instrumentation, and the generated one or more effective learning improvement strategies. By way of example, the mentoring activities may include the actual atomic level activities <A> each tagged with expected duration for completion, expected outcome(s) O, types of mentorships <M>, total duration D required, and preferred list of social media networks or apps <SM>.

In an embodiment, the system and/or method may provide restructuring or re-profiling social media user's profile for refactoring of mentorship and remuneration purpose. Restructuring the profile may include analyzing the user historical data across multiple social media networks or apps (e.g., user posts, discussions, profile data which may include previous experience, job history, education history, previous mentorships, time available for mentoring, and other data sources). Restructuring the profile may also include hierarchically and semantically linking and organizing each profile according to, for example, grade relevance, subject matter (technical or social) or topic relevance, curriculum and learning standards (e.g., Common Core Standard). Restructuring of the profile may further include analyzing real-time posts of the user pertaining to educational purpose. The restructured user profile data can be stored.

In an embodiment, a computer-implemented module, referred to as an incentive generator module (for explanation sake), may analyze the generated atomic level mentoring or tutoring activities (which may include the actual activities A each with expected duration for completion, expected outcome(s) O, type of mentorship M, total duration D required, and preferred list of social media networks or apps SM) and generate an initial incentive amount I (e.g., 8 USD) and payment modality P (e.g., using blockchain-based cryptocurrency). In an embodiment, the system and/or method may construct a mentoring or tutoring request payload as a function of {A, O, M, D, SM, I, P}. In one aspect, payment to the mentor may include, but not limited to currencies or rewards such as cash, social media ratings, and/or others. In an embodiment, the system and/or method may display the request payload on a graphical user interface (GUI) on an end-user device for reviewing and approving by the student or guardian of the student. In an embodiment, the system and/or method may allow for modifying one or more of the request payload values by the student or by the guardian, for example, as feedback. The module may further analyze the feedback (e.g., a motivation level and an amount that the student or guardian is willing to spend for receiving mentorship and help for accelerating the pace of learning of the student) and update the initial request payload accordingly.

In an embodiment, a computer-implemented module, referred to as a mentor identifier module (for explanation sake) may trigger the process of identifying one or more appropriate mentorships using the mentoring or tutoring request payload as input. In an embodiment, identifying mentorships may include identifying mentors from one or more social media networks or apps and progressively evaluating specific mentors using the derived and linked social media user profiles data for the input payload provided. In particular, for example, specific mentors who teach larger more traditional "subjects" (including social aspects) can be evaluated based on their effective improvement of outcomes of students on a set of problem categories, and for example, on problems outside the scope of their normal teaching responsibilities. In some embodiments, this analysis may be accomplished through statistical correlations analysis and may allow refactoring of mentors and students into narrower "problem category" sessions for those mentors who have demonstrated efficiency in raising student performance in a specific problem category. Discovery may occur, where traditional subjects are expanded and, for example, a math mentor is discovered to have a positive effect on students' abilities to reason and perform on questions surrounding the history of the Industrial Revolution.

In some embodiment, for example, through dynamic incentive structuring and a blockchain service, mentors may be remunerated based on their specific outcomes around specific problems that multiple students struggle with and for which mentors have demonstrated the ability to raise performance of the students. Mentors' effective pay may be increased by their specializations in teaching in the areas of problems and student's actual performance as a result of receiving the teaching.

In some embodiments, the system and/or method may establish a contractual agreement between a student (or guardian or like user) and a mentor using blockchain technology. A contractual agreement associated with a mentorship may include agreed upon request payload {A, O, M, D, SM, I, P} along with terms and conditions for the mentorship. For example, in particular, a blockchain is used to create a tamper-proof record and one or more smart contracts to track, store and manage activities associated with mentorships and verify whether the terms and conditions are valid for mentorship activities. The blockchain service invokes the one or more smart contracts associated with expected one or more learning outputs to help validate the mentorship service level agreements, with stored or dynamically composed consents, and to determine the specific selected learning outputs and contextual activities that all parties (student, guardian if applicable, mentors) predicted to comply with at a specified time period. The mentoring service level agreement can be provided for one-time, or for a limited period of time, as examples. When the mentorship is completed, the system and/or method may relay the completion information to the blockchain service. The smart contract and the consensus protocol in the blockchain mentorship service level agreement may facilitate the payment as specified in the request payload (e.g., paying using cryptocurrencies on blockchain). In some embodiments, the smart contract on the blockchain service optionally sends alerts (or tokens) to each party. The storing, managing, and facilitating of educational mentorship activities using blockchain service can be integrated with the social media enabled digital learning environment.

In some embodiments, information pertaining to mentorship can be provided to the student in the form of advertisement, e.g., in dynamic graphical user interface (GUI) format (e.g., of the social network enabled digital learning environment) which may highlight the student's progress graphically (e.g., showing an increase in performance on a particular metric over time). In another aspect, the system and/or method may dynamically notify the potential mentors in the space who can potentially help the student in improving the performance level or increasing the learning pace/curve for the student. In an embodiment, the teacher and/or guardian of the student receiving mentoring may be notified of the engagement, and assist in the educational content that the mentor provides. In another embodiment, the teacher and/or guardian of the student may reject the proposed person selected to perform the mentoring based on a conflict of interest, or other factors.

In some embodiments, the system and/or method may identify the need of the user to learn a new skill based on understanding the user's gathered data, calendar information and current skills. For instance, the system and/or method may detect that User B is going to location X for a meeting. The system and/or method may fetch information from one or more social network servers or platforms (and/or other media sources) that User B may not be fluent in the native language used in location X, and may allow User B to learn advisory or directional words based on time left prior to User B's visit. In one aspect, based on the time constraint and calendar data in combination with User B's knowledge history, relevant information can be advertised to appropriate mentors skilled in respective language, e.g., the native language used in location X. The system and/or method may also consider mentor's calendar data, appropriate time that can be suggested, and an incentive structure as part of a digital payment.

FIG. 1 is a diagram illustrating an example social network enabled digital learning environment in one embodiment. A social network enabled digital learning and tutoring environment includes, for example, learning material, for example, including content related to topic or subject, for example, which may be stored on a storage device 102 and accessible via a user device 104, which a learner may use to learn the content. In one aspect, learning material or content may be also stored by the user device 104, for example, whether temporarily for a period of time or persistently. A computer processor 106, e.g., receives data associated with the learner, while the learner is learning the content via the user device 104. Such data may include sensor data instrumented by the user device 104, such as learning movement of the user, finger pressure on the device, blood pressure, heart rate, and/or other instrumentation or instrumented data about the learner. Such data may also include physical environment surrounding the learner, e.g., lighting, temperature, ambient sound or noise in the area where the learner is using the user device 104 in learning the content. Such data may also include information such as the content item used by the learner in attempting to learn a topic (e.g., used 5 content items), total time spent on the topic (e.g., 2 hours spent on the content items), test or assessment score obtained by the learner (e.g., obtained below classroom average score), effectively engaged time (e.g., 42 minutes), progression of learning (e.g., slow progress in reading where the content or lesson discusses arithmetic of adding angles), observed sentiment (e.g., consistently observed negative sentiment while engaged in this topic).

The computer processor 106, based on the received data, determines learning improvement strategy, for example, for helping the learner to learn more effectively, for example, in the areas of topic in which the learner may have trouble learning. An example output from determining the learning improvement strategy include, but is not limited to, <current and predicted learning status and outcomes, learning context, mastery level, progression level>, and/or others. Based on the learning improvement strategy, the data received, the computer processor 106 generates one or more atomic level mentoring activities for the learner. Examples of atomic level mentoring activities may include, but are not limited to, <student grade x, topic mathematics, improving arithmetic skill by 89%>, <pairwise working on examples for 30 minutes>, . . . <requiring social skill training . . . >, <tutoring time required 1 hour and 20 minutes, incentive Y amount proposed>. The computer processor 106 identifies one or more mentors, for example, suited to provide mentorship in the one or more atomic level mentoring activities to the learner, for example, by accessing social media or social network server data, for example, user profiles stored on one or more social network servers 108 and determines one or more users suitable to be mentors in the areas of the atomic level mentoring activities based on the user (mentor) profile data. In an embodiment, the user (candidate mentor) profiles obtained from one or more social network servers 108, e.g., via a computer or communication network 110, are restructured and stored as a database in a storage device, e.g., at 102, or another storage device coupled to the computer processor 106. In one aspect, a mentor i may be selected to improve a technical aspect (e.g., for an atomic level mentoring activity associated with improving a technical skill). Another mentor, e.g., mentor j may be selected to improve a social aspect (e.g., another atomic level mentoring activity associated with improving a social skill) for the same student or different students.

Figure 2:
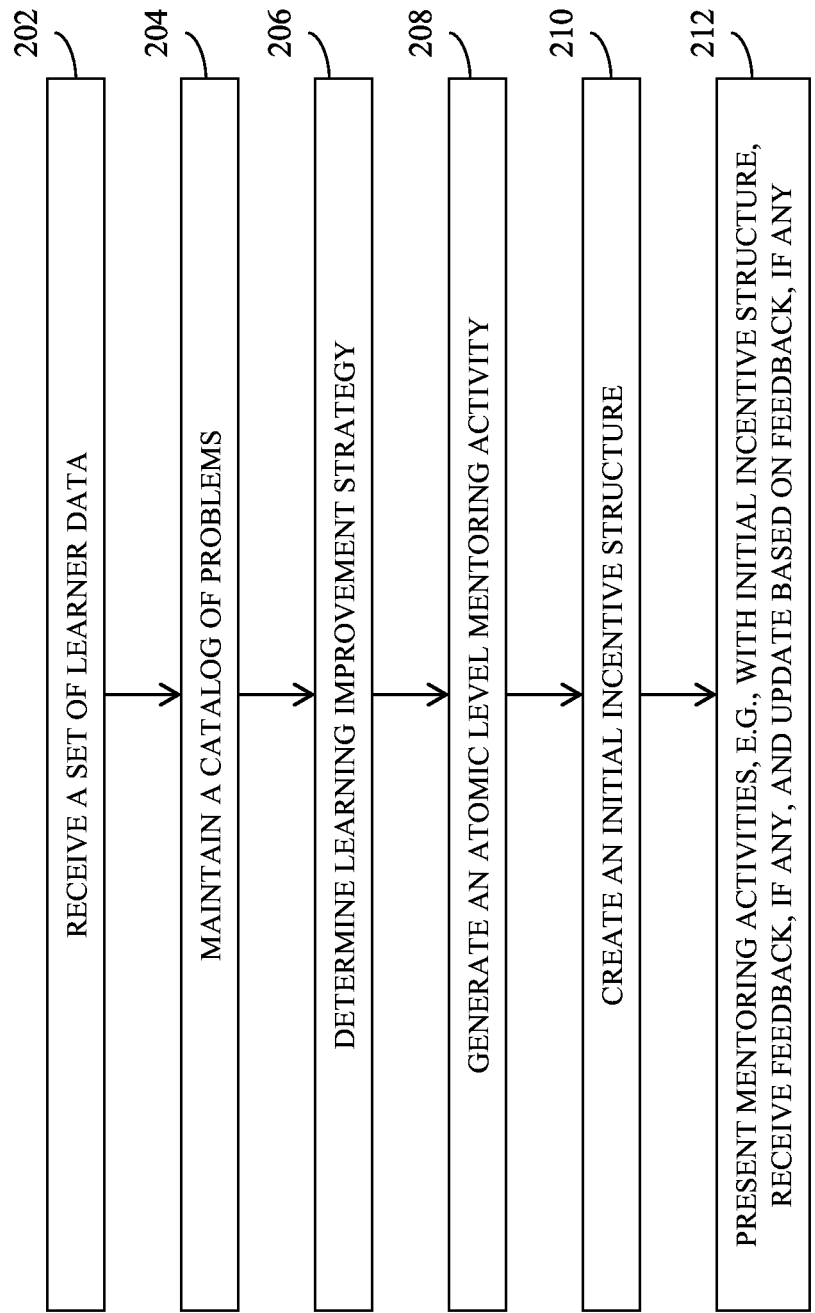
FIG. 2 is a flow diagram illustrating a method of generating a request for mentorship from social media or network server and/or apps in one embodiment.

FIG. 2 is a flow diagram illustrating a method of generating a request for mentorship from social media or network server and/or apps in one embodiment. At 202, a set of learner data may be received. Examples of learner data may include, but are not limited to, historical performance pattern, motivation levels, learning context, historical engagement, interventions, real-time data stream derived from instrumentation, and/or others. Examples of historical performance pattern data may include how a student performed historically, for example, on a topic or subject, on tests or the like. Examples of motivation levels may include how much of motivation a student has in learning the topic or subject, for example, which may be indicated as a numerical value or another value such as low, medium or high. Examples of learning context may include time of the day, other environment context such as lighting, temperature, ambient sound, class size, and/or others. As an example, context data may be represented as numeric values, ranges, or vectors in a multi-dimensional table or space where each dimension represents one aspect of a context, for example, for processing by a computer or one or more hardware processor. Other forms of representing the context data may be implemented for machine processing, for example a feature embedding. Examples of historical engagement may include how a student engaged (e.g., low, medium, high) historically, for example, on a content, topic or subject matter, on tests or the like. Examples of interventions may include types of mentorships, which may have been provided to this learner (e.g., student), for example on-line tutoring, or in-person tutoring. Examples of real-time data stream derived from instrumentation may include sensor data such as student movements determined from a location devices (e.g., global positioning system (GPS), camera or a device that uses face detection technology, wearable physiological measures or the like, while the student is engaged in a topic, e.g., via a user device such as a tablet, personal computer, a mobile smartphone, or another device, sound data, for instance music streaming from a smartphone which might provide an unnecessary distraction. In an embodiment, via a stream computing embodiment, instrument data is processed by a processor, e.g., a special purpose hardware (e.g., FPGAs, ASICs), which extract relevant features from the stream. These features then are analyzed to determine what type of mentorship request is to be issued.

At 204, a catalog of problems may be maintained, for example, across all subjects. A user may be assigned to multiple problem categories based on the user's predicted learning status and outcomes surrounding the specific problems determined based on the set of learner data. For example, analysis may be performed using the learner data, to determine whether the user (learner) is encountering difficulties while engaged in a learning topic or subject. In an embodiment of an implementation, the learner historical data is processed and supplied to one or more machine learning models (e.g., Naive Bayes, Support Vector Machine, Logistic regression, a variant of a neural network (NN) such as Feed-forward Neural Network) to generate prediction models for learning outcomes (e.g., engagement level, coverage index, and/or knowledge model). In an embodiment, the modeling process can be performed offline and the generated models can be deployed for use in real-time.

Problems may mathematics problems, physics problems, chemistry problems, biology questions, history questions, literature questions, or other subject specific problems which can be used to determine mastery levels of the learners. Problem categories may adhere to these traditional labels, or may be learned through unsupervised learning techniques for text analytics such as latent Dirichlet allocation and semantic mapping. Through these analysis, problems may be regrouped into dimensions not otherwise recognized by traditional subjects (for example, exponential economic growth, microbial vectors, recording media), which reflect specific dimensions along which students of a particular type or in a particular context have difficulty.

At 206, based on the catalog of problems and the set of learner data, at least one learning improvement strategy is determined. A learning improvement strategy, for example, if implemented may improve the user's (learner's) performance, engagement, interaction and/or social activities.

In one example implementation in an embodiment, a learning improvement strategy may be selected, generated or assigned to improve a specific problem or a group of problems. For example, based on learned performance (e.g., below average on topic X), engagement (e.g., low against PDF contents provided to the learner on topic X), a predicted risk on learning outcome being "high", a user profile suggesting or indicting poor performance in a prerequisite concept needed for learning topic X, a learning improvement strategy generator (or hardware processor) may determine what types of intervention(s) are needed to improve on the identified problems. In an embodiment, the intervention types can be predefined and stored in an intervention data store. For example, the data store may store predefined intervention types mapped to problems, which the intervention types can address or solve. In an embodiment, the method and/or system of determining the improvement strategy performs further analysis to arrive at the best improvement plan (from the spectrum of academic to social interventions) for the learner.

At 208, one or more atomic level mentoring activities may be generated for the learner based on the set of learner data, the catalog of problems, and at least one learning improvement strategy. In one embodiment, each atomic level mentoring may be targeted to a specific skill and knowledge item based on analyzing of a catalog of problems, plurality of historical learner data points, real-time data stream derived from instrumentation, and generated one or more learning improvement strategies. Such data stream derived from instrumentation of the user device or user application (e.g., digital learning environment) may include data from GPS, face detection device or algorithm, camera, user interactions, and/or user provided comments or feedback (such as the state of the learner). Using one or more machine learning algorithms (e.g., convolutional neural network (CNN), logistic regression), learner engagement, contextual or environmental factors, time spent by the learner at that particular time, and/or other information, can be inferred.

At 210, an initial incentive structure (e.g., amount and payment modality) may be created based on one or more generated atomic level mentoring activities <A>, e.g., each tagged with expected duration (estimated duration for each mentorship activity), expected outcome(s) 0, types of mentorships <M>, total duration D required for mentorship (expected duration of the mentorship program), and a preferred list of social media networks or apps <SM>.

At 212, generated mentoring activities with the initial incentive structure may be presented to the user or the learner or the like. In an embodiment, feedback may be received from the user and the generated mentoring activities and initial incentive structure may be updated based on the feedback.

Figure 3:
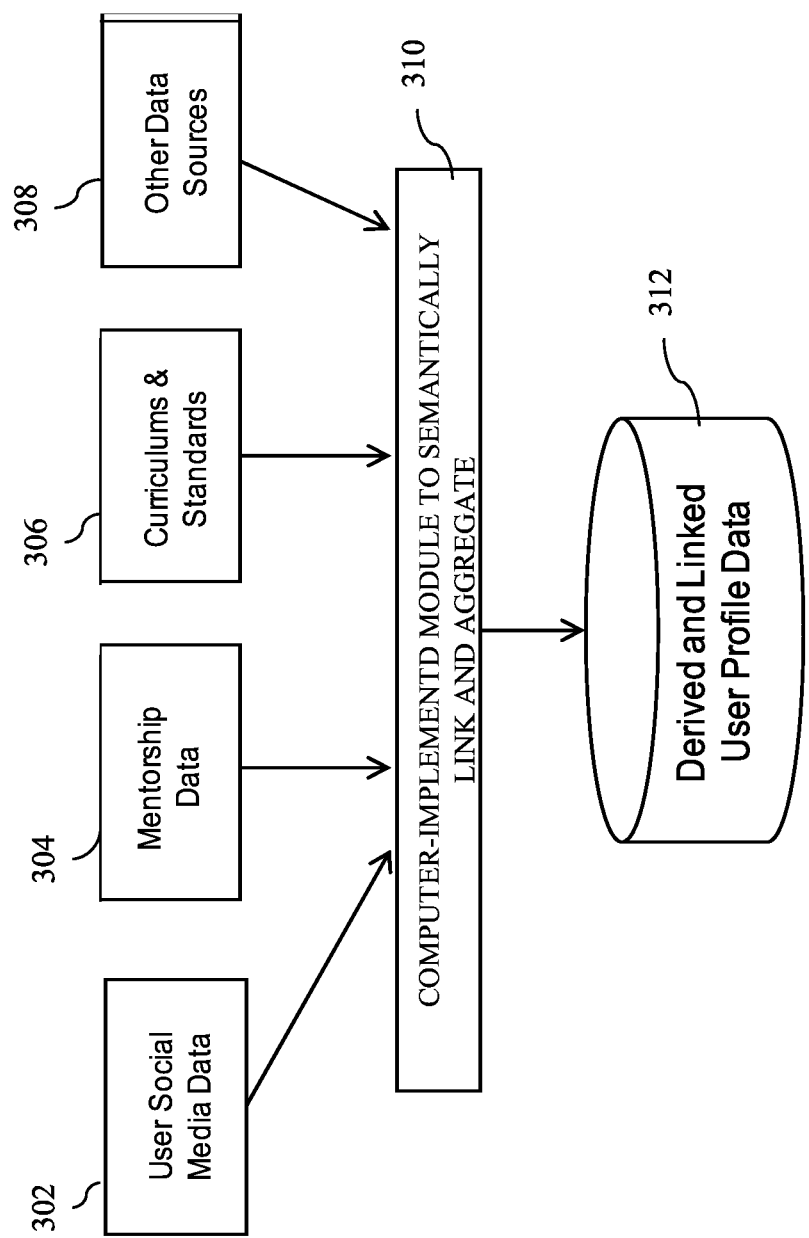
FIG. 3 is a diagram illustrating a user profile data store in one embodiment.

FIG. 3 is a diagram illustrating a user (e.g. learner) profile data store in one embodiment. User social media data 302, for example, may include user postings and communications on a social network server or platform or the like. Mentorship data 304 may include data associated with types of mentorships, and outcome, the user has received, for example, in the past. Curriculum and standards data 306 may include information associated with the type of curriculum or standard of education or learning, with which the user may be engaged. Other data source 308 may include educational history, historical work experiences, project or code repositories (e.g., in software development platform).

A computer-implemented module 310 (e.g., referred to as a semantic linking and aggregation module for explanation sake) may derive user profile data, for example, based on the different data sources (e.g., 302, 304, 306 and 308), and store the derived user profile data in a data storage device 312, for example, as a database. In some embodiments, a method and/or system of semantic linking and aggregation includes analyzing a plurality of social profiles data, extracting semantic links from features of user profiles, creating ontological representations. In an embodiment, semantic linking and aggregation may also include building one or more ontological databases. In an embodiment, the semantic links are links with semantic properties such as concept tags, relationships among concepts, grade relevance, affinities, subject matter (e.g., technical or social), and/or others, which are utilized by custom machine learning models to restructure the user profile pertaining to education mentorship scenario, e.g., user expertise and knowledge levels in atomic concepts or topics, history of successfully improving the performance of learners. Social data may include microblog or another social network/media platform user data, for example, including posts and interaction with posts on a social media/network platform, and other data such as direct messages sent and/or received to this profile, social network data including interaction with posts on a social network platform with a social network user profile, interaction with posts on a social network platform with a social network page profile, a professional social network user data including shared posts with a professional social network member profile, reply to and like posts on professional social network organization pages with a professional social network organization page profile; and user data from a video sharing website or platform including video posts (e.g., including education video), interactions with posts on such video sharing website or platform.

In an embodiment, decomposition of teaching strengths (atomic) is based on a restructured or re-profiled social media user's profile for refactoring of mentorship and, e.g., remuneration purpose. Restructuring the profile in an embodiment includes analyzing the user historical data across multiple social media networks or apps (e.g., including user posts, discussions, profile data including previous experience, job history, education history, previous mentorships and their successful outcomes, and other data sources). The user profile is hierarchically and semantically linked and organized according to, e.g., grade relevance, subject matter (technical or social) or topics relevance, curriculum and learning standards. Using statistical correlations analysis, the system in one embodiment refactors mentors and students (learners) into narrower "problem" sessions for those mentors who have demonstrated efficiency in raising student performance in given problems.

Figure 4:
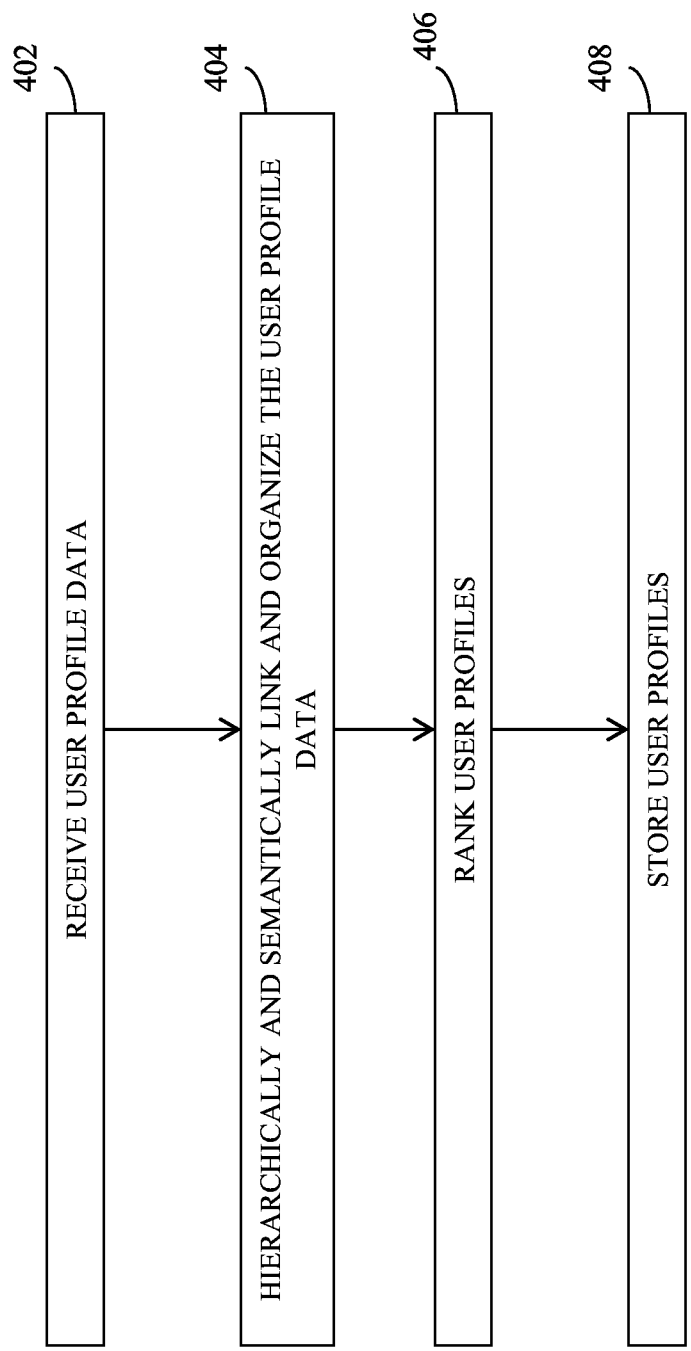
FIG. 4 is a flow diagram illustrating restructuring of social network user profile in one embodiment.

FIG. 4 is a flow diagram illustrating restructuring of social network user profile in one embodiment. At 402, user profile data of a social network user, for example, posts by the user, discussions, previous experience, job history, education history, previous mentorships and their successful outcomes, and/or other information (e.g., shown at 302, 304, 306, and/or 308 in FIG. 3) are received and analyzed.

At 404, the user profile data may be hierarchically and semantically linked and organized, for example, according to various factors, e.g., grade relevance, subject matter (e.g., technical or social) or topic relevance, curriculum and learning standards, based on an analysis of one or more profiles of a social network user. In an embodiment, the extracted semantic links from features of user profiles, created ontological representations and ontological databases are used to refine and organize the social media user profiles. In one example, the refined social media user profiles is hierarchical organized, e.g., based on a set of prerequisite dependencies for atomic concepts, grade precedents, and/or priority of mentorship requests for a specific atomic topics. At 406, the social media user profile is ranked, for example, based on technical and social aspects, historical mentoring or tutoring services, and analysis of other context data. At 408, the social network user profiles are stored, for example, in a database, for example, saved or stored to a storage device.

Figure 5:
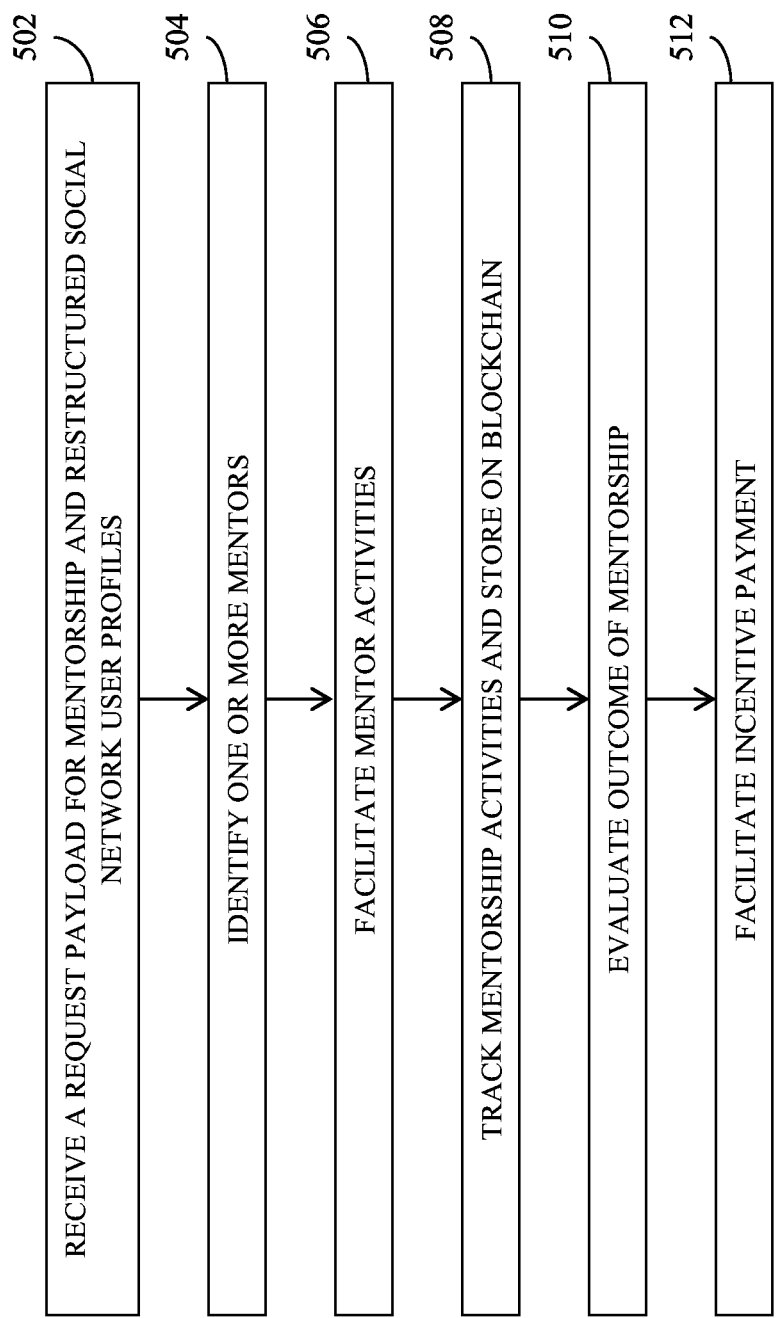
FIG. 5 is a flow diagram illustrating a method of identifying mentors and facilitating mentorship and payment in one embodiment.

FIG. 5 is a flow diagram illustrating a method of identifying mentors and facilitating mentorship and payment in one embodiment. At 502, a request payload for mentorship and restructured social network user profiles are received. At 504, one or more mentors are identified based on the request payload and restructured social network user profiles. For example, mentors are identified by progressively evaluating specific mentors through statistical correlations analysis, refactoring of mentors and students into narrower problem sessions for those mentors who have demonstrated efficiency in raising student performance in given subject areas.

At 506, mentor activities are facilitated through social network enabled digital learning environment. In some embodiments, the facilitation of mentorship activities may include posting or displaying the mentorship activities in sequence according to a criterion (e.g., degree of learning difficulty, learning improvement strategies such as suggesting to work on social skill like engagement before academic skills), for example, on a social media type graphical user interface or another user interface.

At 508, mentorship activities are tracked and stored on blockchain. For example, a contractual agreement can be established between a learner (or like user) and a mentor using blockchain. A contractual agreement associated with a mentorship may include agreed upon request payload {A, O, M, D, SM, I, P} along with terms and conditions for the mentorship. For example, a blockchain is used to create a tamper-proof record and one or more smart contracts to track, store and manage activities associated with mentorships and verify whether the terms and conditions are valid for mentorship activities. The blockchain service invokes the one or more smart contracts associated with expected one or more learning outputs to help validate the mentorship service level agreements, with stored or dynamically composed consents, and to determine the specific selected learning outputs and contextual activities that all parties (e.g., learner and mentors) predicted to comply with at a specified time period. The mentoring service level agreement can be provided for one-time, or for a limited period of time, as examples. When the mentorship is completed, the completion information is relayed to the blockchain service At 510, an outcome of the mentorship is evaluated based on learning outcomes. In some embodiments, data (e.g., activities) collected during the mentorship duration are stored in blockchain and off-blockchain learner data store. These data may include interactions of the learner with the mentor(s) for mentorship and/or with one or more contents (e.g., both learning materials and test or assessments) used during the mentorship, and test or assessment results. The data are assessed to infer how the student engaged, how the student performed against the planned learning improvement strategies, how quickly the student answered test/quiz questions, compared with previous engagement and performance to measure the degree of mentorship outcomes. This can be done by using one or more heuristics and machine learning based models. In one aspect, the machine learning based models may be performed using a wide variety of methods or combinations of methods, such as supervised learning, unsupervised learning, temporal difference learning, reinforcement learning and so forth.

At 512, an incentive payment is facilitated, for example, using cryptocurrencies on blockchain. For instance, the smart contract and the consensus protocol in the blockchain mentorship service level agreement facilitates the payment as specified in the request payload (e.g., paying using cryptocurrencies on blockchain). In some embodiments, the smart contract on the blockchain service optionally sends alerts (or tokens) to each party. The storing, managing, and facilitating of educational mentorship activities using blockchain service can be integrated with the social media enabled digital learning environment. In one embodiment, the integration may include implementing data replication techniques and shared business functions via service-oriented architectures and distributed business processes through service broker mechanisms, libraries and/or application programming interfaces (APIs). In another embodiment, the incentive payment can include favorable reviews on social media websites.

Figure 7:
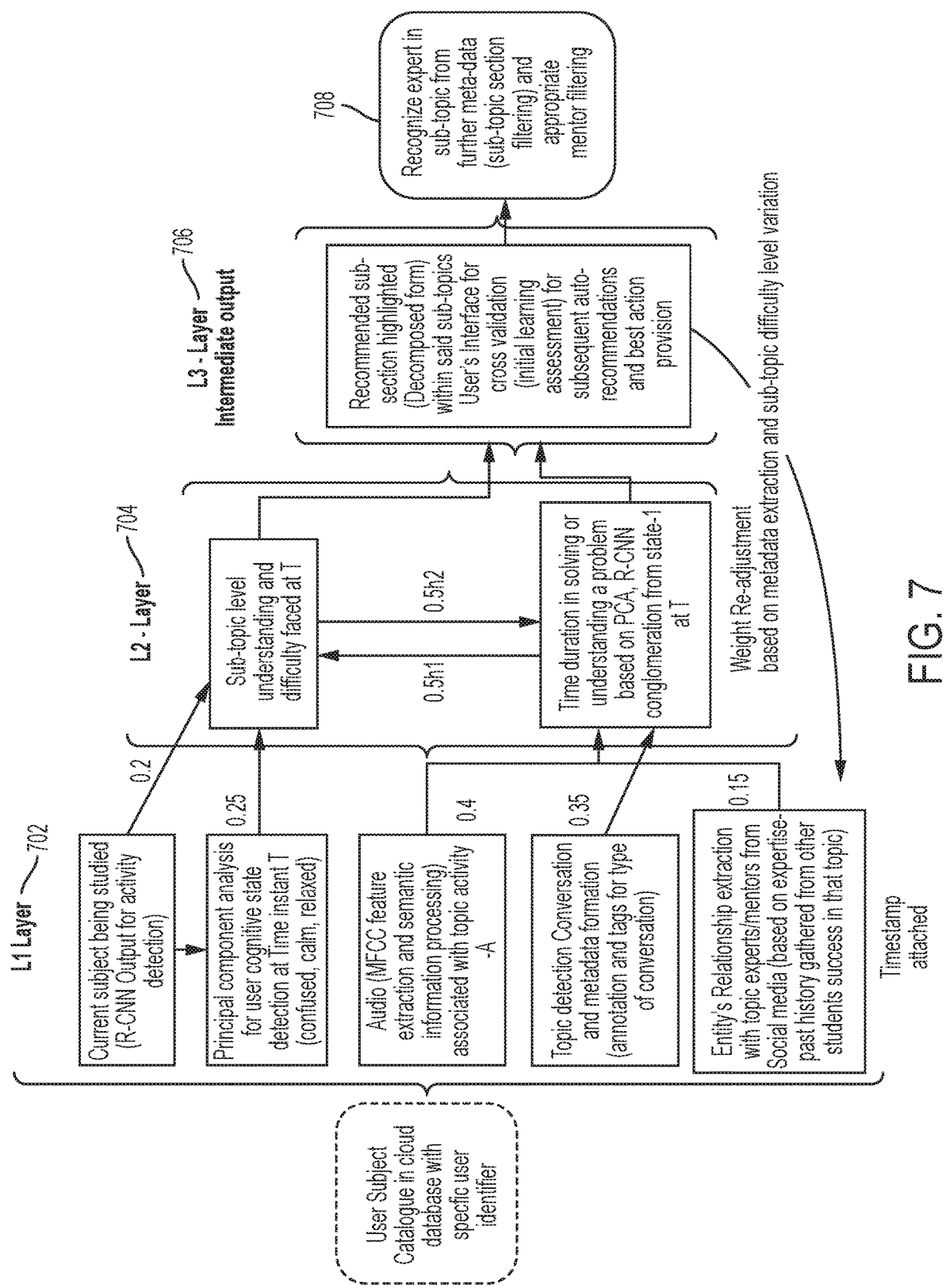
FIG. 7 illustrates an example neural network in one embodiment.

In an embodiment, a neural network may be implemented to generate atomic level mentoring activities. Data sources associated with a learner may be received, which in an embodiment includes historical performance pattern, motivation levels, learning context, historical engagement, interventions, and real-time data stream derived from instrumentation. In an embodiment, using data sources associated with a learner, a system of the present disclosure in an embodiment maintains a catalog of problems across all subjects, with learners assigned to multiple problems based on their current and predicted learning status and outcomes surrounding the specific problems. In an embodiment, the decomposition of the problems into atomic parts and the selection of the categories of the atomic parts can be done using a multi-layer neural network model. FIG. 7 illustrates an example neural network in one embodiment. In an embodiment, FIG. 7 shows a multi-layer neural network model or deep stacked learning network with different layers. The first layer 702 highlights a set of input parameters or features which are used as a starting point to configure or compute the atomic refactoring of appropriate mentors and sub-topic extraction. As shown in L1 layer 702, in an embodiment, the feature inputs comprise of multidimensional vectors pertaining to current object/activity being studied which can be done using a regional convolutional neural network (R-CNN) technique and machine learning (ML) based visual analytics mechanisms. Other input feature in the deep learning model includes cognitive state detection at a particular time-period T which helps in understanding the emotional and mental state/attributes of the user. In an embodiment, the cognitive state of the user can be understood or determined via a principal component analysis for segmenting the user's levels of emotions along a 1-Dimensional grid and categorizing them into a simplistic form (e.g., calm, confused, or another state). Another input feature includes audio features extraction via MFCC (Mel Frequency Cepstral Coefficients) for understanding or determining the aural activity of the user, which can help in predicting the sub-topic understanding of the user(s). Topic detection and metadata formation are also input as features, as a subset in the same layer, to have a semantic understanding of the topic based on natural language processing (NLP) and keyword extraction. Yet another factor includes user's relationship with different entities or people found on social media or network (online platform or server) and extraction of their skills which aids in directing (identifying) the most suitable mentor for a specific user based on the sub-topic being studied. In an embodiment, all the values which are being fed from layer 1 (L1 layer) 702 to the second layer 704 are weights which can be re-configured or trained over a period of time (e.g., via gradient descent) based on learning user's topic, cognitive state, skills acquired or to be acquired. In an embodiment, the second layer 704 brings more refinement or granularity in detail for sub-topic understanding of the content being studied and correlating the same with the user's skills and cognitive state. In an embodiment, the features are time-stamped in order to understand the average amount of time taken by the user in solving a particular problem corresponding to a specific subject under study, e.g., since this helps in evaluating if the user is struggling with the subject or has a stronghold on a specific sub-topic. These middle layer 704 parameters are fed in the third layer 706, which provides a computation of the output obtained via analysis of previous layers and conveys the information on a graphical user interface (GUI) to highlight the sub-topics. The third layer 706 also includes presenting an inquiry on the GUI, if the highlighted section is the correct sub-topic under investigation where the user seems to be struggling. Responsive to the user confirming the same on the interactive interface (e.g., GUI), the fourth layer 708 determines specific experts which can be recommended from social media portal pertaining to the specific sub-topic under investigation, and provides the recommendation to the user's interface, for example, the GUI.

In an embodiment, detecting current and predicted learning status and outcomes surrounding the specific problems includes detecting learner's performance pattern and initial motivation level, analyzing learning context (e.g., time of the day, content and environmental related context, learner state), identifying their mastery on skills being studied or attained, for example, via semantic analysis, natural language processing, and recognizing the level of their engagement deterioration beyond a configurable threshold level over time. In an embodiment, the detected current and predicted learning status and outcomes are used to generate an initial set of interventions, which are fed to a computer-implemented module that generates one or more learning improvement strategies (e.g., which are determined to be effective and optimal) along engagement, performance, interaction and/or social activity metrics.

In an embodiment, the system of the present disclosure dynamically generates atomic level mentoring or tutoring activities, each of which may be targeted to specific skills and knowledge items based on analyzing a catalog of problems, a plurality of historical learner data points, additional real-time data stream derived from instrumentation, and generated one or more effective learning improvement strategies. This way, atomic level mentoring activities are selected to match the learner problem atomic level parts. In another aspect, atomic level mentoring activities can be used to determine what a leaner's problem atomic level parts. For example, the system may identify that the learner does not understand geometric angles (atomic part of student problem) so it can assign a mentor who teaches geometric angles well. The system may also compare the learner to other similar cohorts of learners who were helped by a mentor who teaches geometric angles and therefore assume the learner needs teaching in geometric angles. By way of another example, the mentoring activities may include the actual atomic level activities <A> each tagged with expected duration, expected outcome(s) 0, types of mentorships <M>, total duration D required, preferred list of social media networks or apps <SM>.

A social network enabled digital learning and tutoring environment includes, for example, learning material, for example, including content related to topic or subject, for example, which may be stored on a storage device 102 and accessible via a user device 104, which a learner may use to learn the content. In one aspect, learning material or content may be also stored by the user device 104, for example, whether temporarily for a period of time or persistently. A computer processor 106, e.g., receives data associated with the learner, while the learner is learning the content via the user device 104. Such data may include sensor data instrumented by the user device 104, such as learning movement, finger pressure on the device, and/or other instrumentation or instrumented data about the learner. Such data may also include physical environment surrounding the learner, e.g., lighting, temperature, ambient sound or noise in the area where the learner is using the user device 104 in learning the content. Such data may also include information such as the content item used by the learner in attempting to learn a topic (e.g., used 5 content items), total time spent on the topic (e.g., 2 hours spent on the content items), test or assessment score obtained by the learner (e.g., obtained below classroom average score), effectively engaged time (e.g., 42 minutes), progression of learning (e.g., slow progress in reading where the content or lesson discusses arithmetic of adding angles), observed sentiment (e.g., consistently observed negative sentiment while engaged in this topic).

The computer processor 106, based on the received data, determines learning improvement strategy, for example, for helping the learner to learn more effectively, for example, in the areas of topic in which the learning may have trouble learning. An example output from determining the learning improvement strategy include, but is not limited to, <current and predicted learning status and outcomes, learning context, mastery level, progression level>, and/or others. Based on the learning improvement strategy, the data received, the computer processor 106 generates one or more atomic level mentoring activities for the learner. Examples of atomic level mentoring activities may include, but are not limited to, <student grade x, topic mathematics, improving arithmetic skill by 89%>, <pairwise working on examples for 30 minutes>, . . . <requiring social skill training . . . >, <tutoring time required 1 hour and 20 minutes, incentive Y amount proposed>. The computer processor 106 identifies one or more mentors, for example, suited to provide mentorship in the one or more atomic level mentoring activities to the learner, for example, by accessing social media or social network server data, for example, user profiles stored on one or more social network servers 108 and determines one or more users suitable to be mentors in the areas of the atomic level mentoring activities based on the user profile data. In an embodiment, the user profiles obtained from one or more social network servers 108, e.g., via a computer or communication network 110, are restructured and stored as a database in a storage device, e.g., at 102, or another storage device coupled to the computer processor 106. In one aspect, a mentor i may be selected to improve a technical aspect (e.g., for an atomic level mentoring activity associated with improving a technical skill). Another mentor, e.g., mentor j may be selected to improve a social aspect (e.g., another atomic level mentoring activity associated with improving a social skill).

Figure 6:
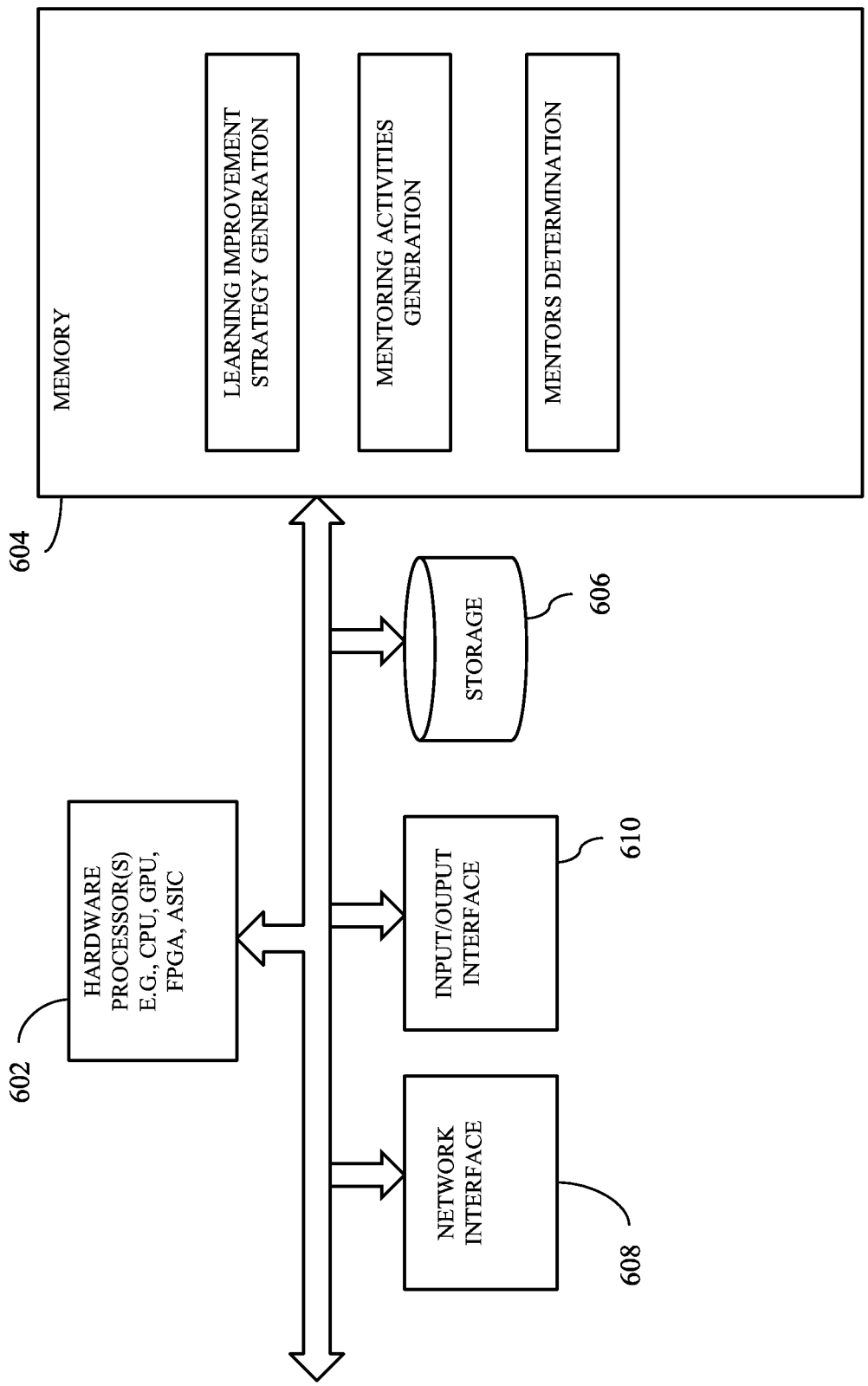
FIG. 6 is a diagram showing components of a system in one embodiment, which provides social network enabled digital learning environment.

FIG. 6 is a diagram showing components of a system in one embodiment that provides social network enabled digital learning environment in one embodiment. One or more hardware processors 602 such as a central processing unit (CPU), a graphic process unit (GPU), and/or a Field Programmable Gate Array (FPGA), an application specific integrated circuit (ASIC), and/or another processor, are coupled with a memory device 604, and function to provide social network enabled digital learning environment in one embodiment. The memory device may include random access memory (RAM), read-only memory (ROM) or another memory device, and may store data and/or processor instructions for implementing various functionalities associated with the methods and/or systems described herein. A processor 602 may execute computer instructions stored in the memory or received from another computer device or medium. The memory device 604 may, for example, store instructions and/or data for functioning of the one or more hardware processors 602, and may include an operating system and other program of instructions and/or data.

In an embodiment, one or more hardware processors 602 receive input comprising data associated with the learner, state of the learner while learning the content, for example, via a user device such as a tablet, a laptop, a desk top, or another computer or device. The data received by one or more hardware processors 602, for example, includes sensor data instrumented by the user device, such as learning movement, finger pressure on the device, eye gaze or movements, and/or other instrumentation or instrumented data about the learner. The data received by one or more hardware processors 602 may also include physical environment surrounding the learner, e.g., lighting, temperature, ambient sound or noise in the area where the learner is using the user device in learning the content. Based on at least some of the data received, one or more hardware processors 602 generate a learning improvement strategy. Based on at least a generated learning improvement strategy, one or more hardware processors 602 generate one or more atomic level mentoring activities for the learner.

In an embodiment, one or more hardware processors 602 presents the one or more atomic level mentoring activities for the learner and an incentive structure, which for example, includes a payment amount and payment modality, for example, for possible receiving tutoring in one or more atomic level mentoring activities. Such information may be presented via a user interface, which allows a user to modify the information, and provide a feedback to one or more hardware processors 602. Based on the feedback, if any, and the one or more atomic level mentoring activities, one or more hardware processors 602 may identify one or more mentors suitable for tutoring the learner.

In an embodiment, one or more hardware processors 602 identify one or more mentors, for example, suited to provide mentorship in the one or more atomic level mentoring activities to the learner, for example, by accessing social media or social network server data, for example, via a network interface 608. In an embodiment, one or more hardware processors 602 restructures the user profiles obtained from one or more social network servers and stores the restricted user profile as a database in a storage device, e.g., 606.

One or more hardware processors 602 are coupled with interface devices such as a network interface 608 for communicating with remote systems, for example, via a network, and an input/output interface 610 for communicating with input and/or output devices such as a keyboard, mouse, display, and/or others.

Figure 8:
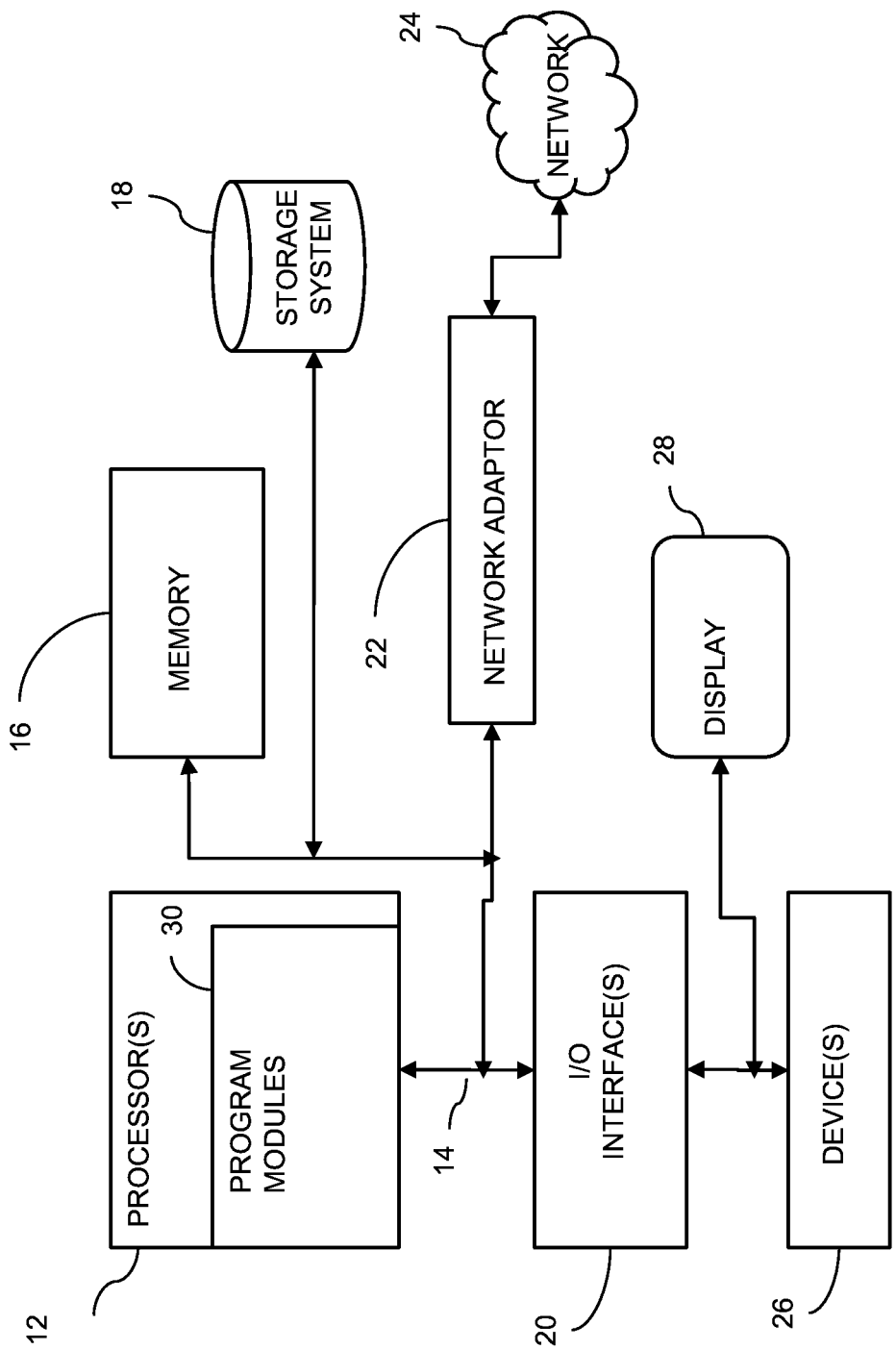
FIG. 8 illustrates a schematic of an example computer or processing system that may implement a system according to one embodiment.

FIG. 8 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
receiving a set of learner data associated with a learner, the set of learner data comprising at least a real-time data stream derived, in a social network enabled digital learning environment;
based on the set of learner data, determining at least one learning improvement strategy for improving the learner's learning capability;
generating atomic level mentorship activities, each atomic level mentorship activity targeted with a specific skill and knowledge item and having an estimated duration period;
identifying mentorship from at least one social network platform;
creating an initial incentive structure comprising at least an amount of payment and payment modality; and
presenting the atomic level mentorship activities with the initial incentive structure, wherein the atomic level mentorship activities are generated based on training a neural network, the neural network including at least a first layer comprising multidimensional vectors pertaining to current activity being studied and features representing cognitive state of the learner at a particular time-period T, power spectrum of a sound representing aural activity of the learner, and the learner's relationship with different entities found on the social network, the neural network further including a second layer comprising features representing granularity in detail for sub-topic understanding of content being studied, the neural network further including a third layer providing a computation of output obtained via analysis of previous layers, the neural network learning weights for feeding inputs from the first layer to the second layer, the features of the first layer fed into the second layer, wherein at least some of the features of the first layer fed into the second layer are time stamped;
tracking and storing the atomic level mentoring activities on a blockchain;
evaluating an outcome of providing the atomic level mentoring activities based on learning outcomes of the learner; and
composing and facilitating payment using cryptocurrencies on the blockchain.

2. The method of claim 1, further comprising: maintaining a catalog of problem areas associated with the learner based the set of learner data.

3. The method of claim 1, wherein the atomic level mentorship activities are generated based on analyzing the catalog of problem areas, a plurality of historical learner data points, and the real-time data stream derived from instrumentation, and the at least one learning improvement strategy.

4. The method of claim 1, wherein the initial incentive structure is generated at least based on the atomic level mentorship activities, one or more expected outcomes, types of mentorship, total duration required for mentorship, and a list of preferred social network platforms.

5. The method of claim 1, further comprising restructuring a social network user profile to identify the at least one mentorship by analyzing social network user historical data.

6. The method of claim 5, further comprising hierarchically and semantically linking and organizing the social network user profile according to grade relevance, subject matter, and curriculum and learning standards.

7. A computer program product comprising a computer readable storage medium having program instructions embodied therewith, the program instructions readable by a device to cause the device to:
receive a set of learner data associated with a learner, the set of learner data comprising at least a real-time data stream, in a social network enabled digital learning environment;
based on the set of learner data, determine at least one learning improvement strategy for improving the learner's learning capability;
generate atomic level mentorship activities, each atomic level mentorship activity targeted with a specific skill and knowledge item and having an estimated duration period;
identify mentorship from at least one social network platform;
create an initial incentive structure comprising at least an amount of payment and payment modality; and
present the atomic level mentorship activities with the initial incentive structure, wherein the atomic level mentorship activities are generated based on training a neural network, the neural network including at least a first layer comprising multidimensional vectors pertaining to current activity being studied and features representing cognitive state of the learner at a particular time-period T, power spectrum of a sound representing aural activity of the learner, and the learner's relationship with different entities found on the social network, the neural network further including a second layer comprising features representing granularity in detail for sub-topic understanding of content being studied, the neural network further including a third layer providing a computation of output obtained via analysis of previous layers, the neural network learning weights for feeding inputs from the first layer to the second layer, the features of the first layer fed into the second layer, wherein at least some of the features of the first layer fed into the second layer are time stamped;
wherein the device is further caused to: track and store the atomic level mentoring activities on a blockchain;
evaluate an outcome of providing the atomic level mentoring activities based on learning outcomes of the learner; and
compose and facilitating payment using cryptocurrencies on the blockchain.

8. The computer program product of claim 7, wherein the device is further caused to: maintain a catalog of problem areas associated with the learner based the set of learner data.

9. The computer program product of claim 7, wherein the atomic level mentorship activities are generated based on analyzing the catalog of problem areas, a plurality of historical learner data points, and the real-time data stream derived from instrumentation, and the at least one learning improvement strategy.

10. The computer program product of claim 7, wherein the initial incentive structure is generated at least based on the atomic level mentorship activities, one or more expected outcomes, types of mentorship, total duration required for mentorship, and a list or preferred social network platforms.

11. The computer program product of claim 7, wherein the device is further caused to restructure a social network user profile to identify the at least one mentorship by analyzing social network user historical data.

12. The computer program product of claim 11, wherein the device is further caused to hierarchically and semantically link and organize the social network user profile according to grade relevance, subject matter, curriculum and learning standards.

13. A system comprising:
at least one hardware processor; at least one memory device communicatively coupled to the at least one hardware processor; the at least one hardware processor operable to:
receive a set of learner data associated with a learner, the set of learner data comprising at least a real-time data stream, in a social network enabled digital learning environment;
based on the set of learner data, determine at least one learning improvement strategy for improving the learner's learning capability;
generate atomic level mentorship activities, each atomic level mentorship activity targeted with a specific skill and knowledge item and having an estimated duration period;
identify mentorship from at least one social network platform;
create an initial incentive structure comprising at least an amount of payment and payment modality; and
present the atomic level mentorship activities with the initial incentive structure, wherein the at least one hardware processor is operable to generate the atomic level mentorship activities based on training a neural network, the neural network including at least a first layer comprising multidimensional vectors pertaining to current activity being studied and features representing cognitive state of the learner at a particular time-period T, power spectrum of a sound representing aural activity of the learner, and the learner's relationship with different entities found on the social network, the neural network further including a second layer comprising features representing granularity in detail for sub-topic understanding of content being studied, the neural network further including a third layer providing a computation of output obtained via analysis of previous layers, the neural network learning % eights for feeding inputs from the first layer to the second layer, the features of the first layer fed into the second layer, wherein at least some of the features of the first layer fed into the second layer are time stamped;
track and store the atomic level mentoring activities on a blockchain;
evaluate an outcome of providing the atomic level mentoring activities based on learning outcomes of the learner; and
compose and facilitating payment using cryptocurrencies on the blockchain.

14. The system of claim 13, wherein the at least one hardware processor is further operable to maintain a catalog of problem areas associated with the learner based the set of learner data.

15. The system of claim 13, wherein the atomic level mentorship activities are generated based on analyzing the catalog of problem areas, a plurality of historical learner data points, and the real-time data stream derived from instrumentation, and the at least one learning improvement strategy.

16. The system of claim 13, herein the initial incentive structure is generated at least based on the atomic level mentoring activities, one or more expected outcomes, types of mentorship, total duration required for mentorship, and a list of preferred social network platforms.

17. The system of claim 13, wherein the at least one hardware processor is further operable to restructure a social network user profile to identify the at least one mentorship by analyzing social network user historical data, wherein the at least one hardware processor is further operable to hierarchically and semantically link and organize the social network user profile according to grade relevance, subject matter, curriculum and learning standards.

18. The system of claim 13, wherein the payment comprises one or more of currencies representing cash and social media rating.

* * * * *